United States Patent [19]
Watkins

[11] Patent Number: 6,105,110
[45] Date of Patent: Aug. 15, 2000

[54] CIRCUIT AND METHOD FOR REPLACEMENT OF ADDRESS TRANSLATIONS

[75] Inventor: John E. Watkins, Sunnyvale, Calif.

[73] Assignee: Sun Microsystems, Inc., Mountain View, Calif.

[21] Appl. No.: 09/436,932

[22] Filed: Nov. 8, 1999

Related U.S. Application Data

[63] Continuation of application No. 08/673,004, Jul. 1, 1996, Pat. No. 5,991,854.

[51] Int. Cl.[7] .................................................. G06F 12/12
[52] U.S. Cl. ........................................ 711/135; 711/207
[58] Field of Search .................................. 711/135, 206, 711/207, 208, 209, 210, 133, 147, 159, 203; 709/245

[56] References Cited

U.S. PATENT DOCUMENTS

| | | | |
|---|---|---|---|
| 4,218,743 | 8/1980 | Hoffman et al. | 364/200 |
| 4,349,875 | 9/1982 | Tada | 364/200 |
| 4,381,540 | 4/1983 | Lewis et al. | 364/200 |
| 4,933,937 | 6/1990 | Konishi | 370/85.13 |
| 5,155,825 | 10/1992 | Moughanni et al. | 395/425 |
| 5,293,488 | 3/1994 | Riley et al. | 395/200 |
| 5,390,173 | 2/1995 | Spinney et al. | 370/60 |
| 5,428,615 | 6/1995 | Backes et al. | 370/85.13 |
| 5,509,131 | 4/1996 | Smith et al. | 395/416 |
| 5,592,625 | 1/1997 | Sandberg | 395/200.08 |
| 5,764,944 | 6/1998 | Hwang et al. | 395/417 |

FOREIGN PATENT DOCUMENTS

| | | | |
|---|---|---|---|
| 0 062 175 A2 | 10/1982 | European Pat. Off. | G06F 13/00 |
| 0 250 702 A2 | 1/1988 | European Pat. Off. | G06F 12/12 |
| 2 221 066 | 1/1990 | United Kingdom | G06F 12/08 |

OTHER PUBLICATIONS

"Integrated Memory Management for the MC68030", Kirk Holden and Steve McMahan, Motorola, Inc., Microprocessor Products Group (OE38), pp. 586–589.

Primary Examiner—Do Hyun Yoo
Assistant Examiner—Gary J. Portka
Attorney, Agent, or Firm—Blakely Sokoloff Taylor & Zafman

[57] ABSTRACT

A circuit used to control the modification of content within memory implemented within an address translation unit. This memory includes a plurality of entries which contain virtual and physical addresses associated with an address translation. The circuit includes an update control circuit coupled to the address translation circuit. The update circuit is configured to set an entry to an invalid state or point to an entry to be loaded with a new address translation. The circuit further includes a flush control circuit that is configured to control the update control circuit. Such control includes setting an entry to an invalid state upon detecting a particular event.

23 Claims, 9 Drawing Sheets

CIRCUIT AND METHOD FOR REPLACEMENT OF ADDRESS TRANSLATIONS

CROSS-REFERENCES TO RELATED APPLICATIONS

This is a continuation of a U.S. patent application (application Ser. No. 08/673,004) filed Jul. 1, 1996, now U.S. Pat. No. 5,991,854. The named inventor of the present application has concurrently filed a number of pending United States patent applications, including "Asynchronous Transfer Mode (ATM) Segmentation And Reassembly Unit Virtual Address Translation Unit Architecture" (application Ser. No. 08/672,982); "Asynchronous Transfer Mode (ATM) Segmentation And Reassembly Unit Virtual Address Translation Unit Architecture" (application Ser. No. 09/121,647); and "A Circuit And Method For Segregating Memory In An Address Translation Unit" (application Ser. No. 08/673,050). The named inventor is also named on two United States patents entitled "A Circuit And Method For Flush Checking Memory Of An Address Translation Unit" (U.S. Pat. No. 5,937,436) and "Data Buffer Prefetch Apparatus and Method" (U.S. Pat. No. 5,854,911).

BACKGROUND OF THE INVENTION

1. Field of the Invention

The present invention relates to the field of data transfer. More particularly, the present invention relates to a circuit and method for replacing address translations contained in an address translation unit.

2. Description of Art Related to the Invention

For over a decade, a number of system architectures have been developed with input/output ("I/O") devices accessing main memory through direct virtual memory accesses using virtual addresses, instead of direct memory accesses ("DMAs") using physical addresses. One advantage associated with DVMA systems has been the simplification of data accesses by the I/O device. For example, I/O devices accessing memory through DMAs ("DMA I/O devices") must be controlled to "scatter" (or allocate) data to a number of potentially discontiguous physical pages as well as to "gather" data. Gathering data that exceeds one page in length is normally accomplished by accessing a group of discontiguous physical pages. In contrast, I/O devices that access main memory through DVMAs ("DVMA I/O devices") do not require such control because data accesses are made through contiguous virtual pages.

Although the DVMA systems have simplified this "scatter-gather" problem, these systems require the virtual addresses issued by the DVMA I/O devices to be translated into physical addresses before data can be accessed from main memory. As shown in FIG. 1, a conventional DVMA system 100 utilizes an I/O Memory Management Unit "I/O MMU" 110, sometimes referred to as an I/O Translation Lookahead Buffer, to translate virtual addresses to physical addresses utilized by main memory 120. As shown, the I/O MMU 110 is implemented within a bridge element 130 that couples an I/O bus 140 and a system bus 150.

Typically, the I/O MMU 110 is often configured to contain a limited number "r" of address translations (e.g., 16 fully-associative entries) to increase system performance with minimal additional costs. Thus, a plurality of I/O DVMA devices $160_1$–$160_i$ ("i" being a whole number, i>2) are restricted to collectively use at most "r" virtual pages without mitigating system performance. If a requested address translation is not contained within the I/O MMU 110, resulting in an I/O MMU "miss", the requested address translation must be fetched from main memory 120 which contains all potential address translations. Of course, such fetching reduces system performance.

With the emergence of multi-media communications, networks are now being required to support multiple data types. As a result, network manufacturers are tending to concentrate their efforts toward asynchronous transfer mode ("ATM") networks. In ATM networks, a large number of virtual channels, perhaps hundreds, can be in operation simultaneously. Hence, if the DVMA system 100 is configured to support an ATM network coupled to I/O network interface logic 170, it would experience significant performance degradation caused by excessive fetching of address translations from main memory.

Hence, it would be advantageous to develop an address translation unit ("ATU") implemented within and operating in cooperation with a Network Interface Circuit ("NIC") coupled to the I/O bus. The NIC would be used to interconnect the ATM network environment to the DVMA system. More particular to the present invention, it would be advantageous to develop replacement circuitry, being a minimal amount of additional logic that operates in combination with the ATU, to control the loading and replacement of address translations contained in predetermined entries within the ATU. The primary purpose of the replacement circuitry would be to reduce the amount of time that an entry remains in the ATU after accesses to its affiliated virtual page have ceased, and to replace the contents of "valid" entries only if no "invalid" entries are available.

SUMMARY OF THE INVENTION

The present invention relates to a circuit controlling the modification of content within memory implemented within an address translation unit. This memory includes a plurality of entries which contain virtual and physical addresses associated with an address translation.

One embodiment of the circuit includes an update control circuit coupled to the address translation circuit and a flush control circuit coupled to the update control circuit and the address translation circuit. The update control circuit is configured to set an entry to reflect an "invalid" state upon detecting an event such as an end-of-page event. In addition, the update control circuit is configured to indicate which entry to be loaded with a new address translation. Such loading is directed initially to entries in an invalid state. However, if all the entries are in a valid state, loading is performed in accordance with an incremented count value produced by the update circuit. The flush control circuit is configured to signal the update control circuit when the event occurs, and to select the entry to replace.

BRIEF DESCRIPTION OF THE DRAWINGS

The features and advantages of the present invention will become apparent from the following detailed description of the present invention in which.

DESCRIPTION OF THE PREFERRED EMBODIMENT

In the following detailed description, the present invention describes circuitry and a method for controlling replacement of address translations contained in an address translation unit ("ATU") of a Network Interface Circuit ("NIC"). The NIC is adapted to an I/O bus of an electronic system to interconnect the electronic system to an asynchronous transfer mode ("ATM") network supporting a plurality of virtual channels. To avoid obscuring the present invention, some well-known circuits or system configurations are not disclosed in detail.

A number of terms are frequently used herein to describe certain control circuits and binary representations which are defined herein. A "word" is preferably 4 bytes (32-bits) in length, but may be any "$2^x$" byte in length (where $x \geq 0$). A "packet" is a plurality of words stored, transmitted or received in succession. An "address translation" is a mapping between a virtual address and a physical address. A "flush" operation is a removal of an address translation from one or more storage locations. The term "asserted" is defined as the activation or setting of a preselected logic value. Moreover, a "virtual address" may be construed as the entire virtual address or a portion thereof (e.g., a virtual page number). Likewise, a "physical address" may be construed as the entire physical address or a portion thereof (e.g., a physical page number).

Figure 1:
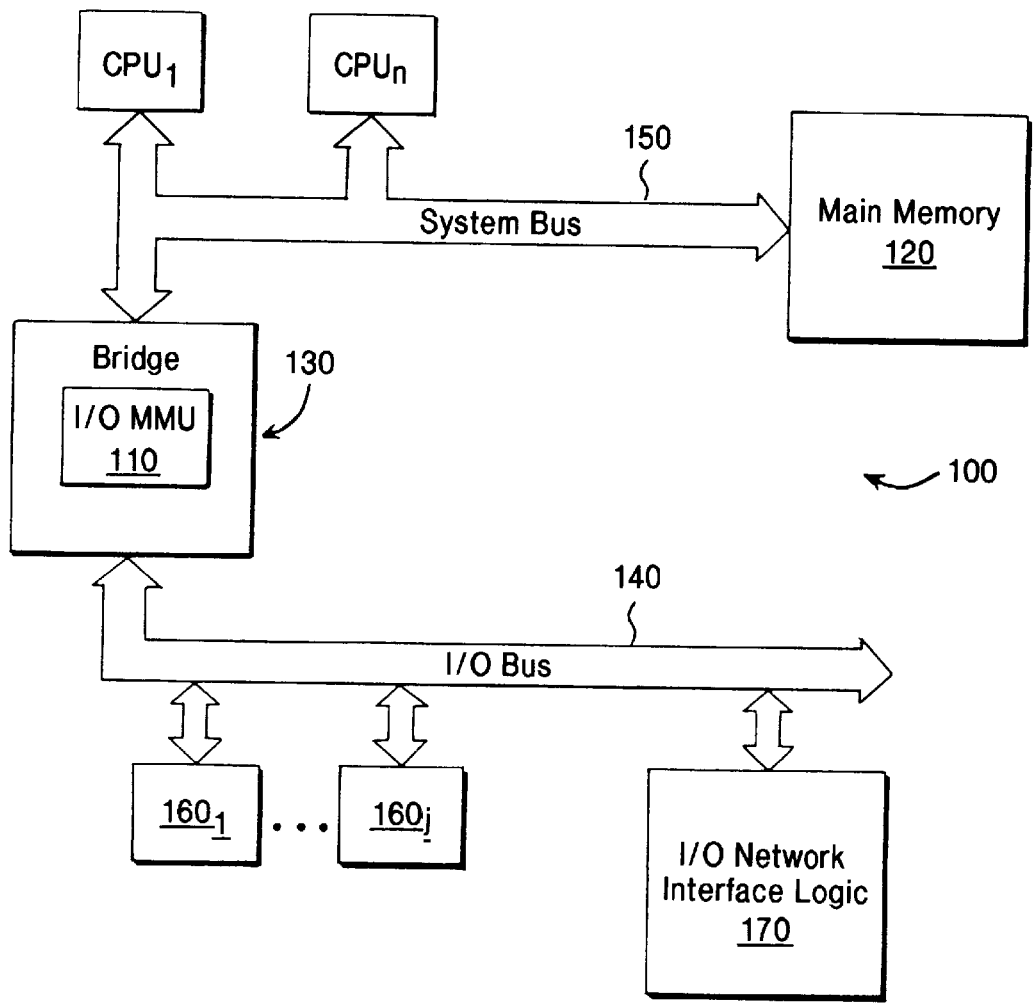
FIG. 1 is a block diagram of a conventional DVMA system including an I/O Memory Management Unit employed within the bridge element.
Figure 2A:
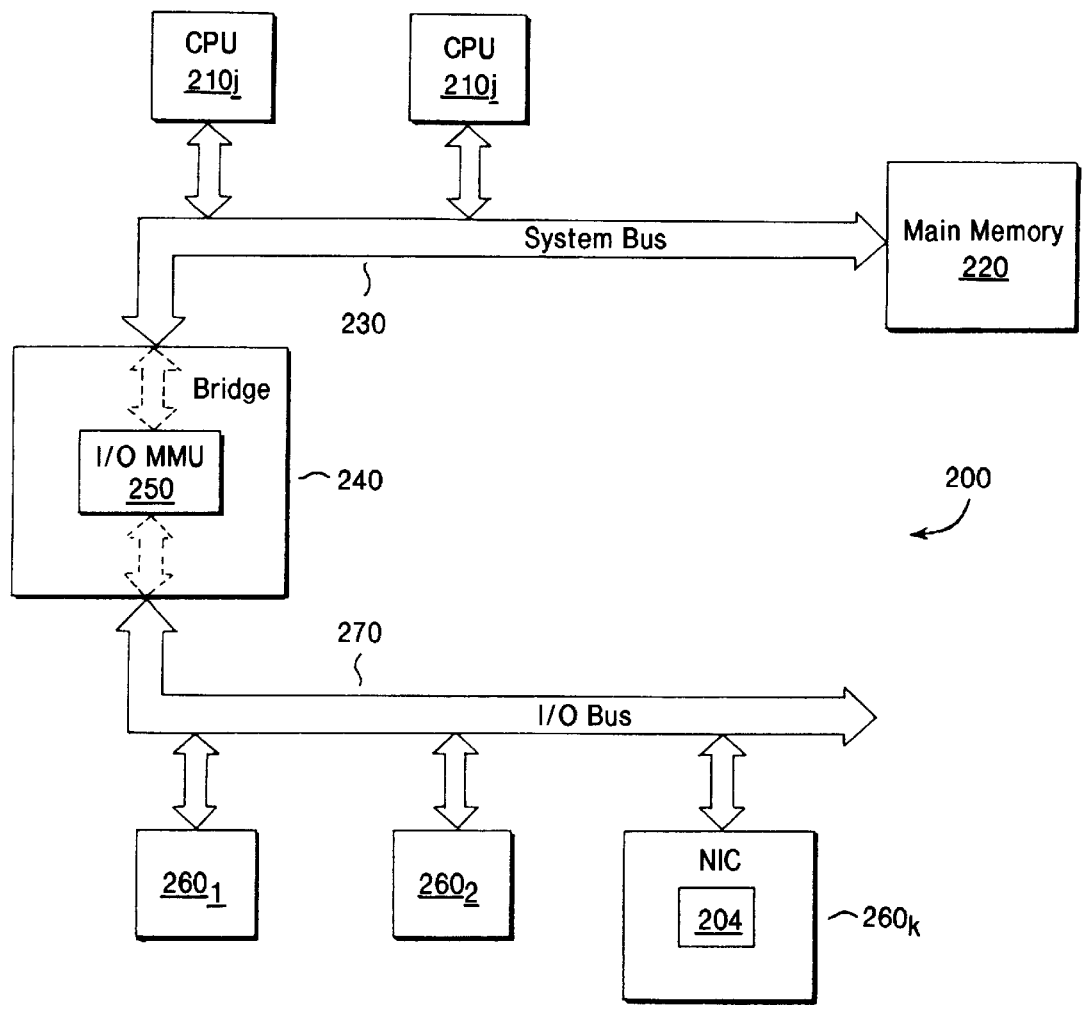
FIG. 2A is a block diagram of an embodiment of an electronic system including an I/O Memory Management Unit employed within the bridge element and an address translation unit ("ATU") employed within a Network Interface Circuit ("NIC").

Referring to FIG. 2A, an embodiment of an electronic system 200 such as, for example, a workstation manufactured by Sun Microsystems of Mountain View, Calif., is illustrated. The electronic system 200 operates as a DVMA system, although it is contemplated that the present invention may function in conjunction with a DMA type system.

As shown, the electronic system 200 comprises one or more multiprocessors $210_1$–$210_j$ ("j" being whole number, $j \geq 1$) coupled to main memory 220 through a system bus 230 to enable communications therebetween. The system bus 230 is further coupled to a bridge element 240, including an I/O MMU 250, to enable communications between components coupled to the system bus 230 (e.g., main memory 220, microprocessor(s) $210_1$–$210_j$, etc.) and a plurality of I/O devices $260_1$–$260_k$ ("k" being whole number, $k \geq 2$) coupled to an I/O bus 270. The I/O bus 270 may include, but is not limited to, a Peripheral Component Interconnect ("PCI") bus developed by Intel Corporation of Santa Clara, Calif. For example, the PCI bus may support 64-bit address/data propagation at approximately 66 megahertz ("MHz") or 32-bit address/data propagation at approximately 33 MHz.

Although not shown, the main memory 220 includes a plurality of free memory buffers, a Receive ("RX") descriptor ring and a RX Completion ring to support RX operations (not shown). Likewise, there are similar elements to support Transmit ("TX") operations. Normally, the buffers are storage locations consecutively addressed in virtual memory, but are not necessarily contiguous in physical memory. The buffers may be of various sizes, occupying one or more virtual pages. Each descriptor ring includes a plurality of descriptors, one of these descriptors being shown in FIG. 2B.

Figure 2B:
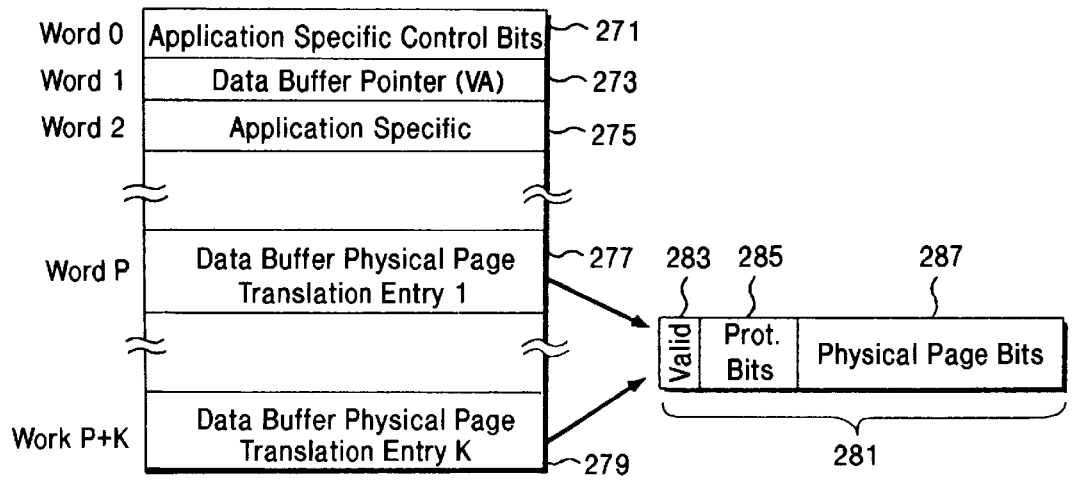
FIG. 2B is a block diagram of an embodiment of a data structure of a descriptor from a descriptor ring stored in main memory of the electronic system.

Referring now to FIG. 2B, a sample descriptor format 289, which is a basic data structure that can be used by a Segment and Reassembly ("SAR") unit to transport packet data between main memory 220 and the network, is shown. In one embodiment, descriptors are arranged (64 bytes apart between each descriptor) in a ring structure (which is not shown). These descriptors point to a set of data packets to be sent to the network (in the transmit case) or the descriptors point to a set of free memory buffers to hold incoming packets (in a receive case). In one embodiment, each descriptor is of a fixed length and comprises a plurality of words, ranging between three and sixteen contiguous 32-bit words. The descriptors are placed consecutively in virtual memory in a ring structure. Each of these descriptors, which are located in main memory, point to a data buffer (in the transmit ("TX") case) which is also located in main memory.

As shown in block 271 of the descriptor 289, word 0 contains application specific control bits. Block 273 illustrates that word 1 contains a virtual address ("VA") pointer which points to the beginning of a data buffer. Block 275 shows that word 2 of the descriptor 289 contains application specific information. The end of the descriptor 277 and 279 contains information on the physical page location of the physical address ("PA") that maps to the virtual address contained in block 273 and associated with this descriptor 289. Block 277 illustrates that word "P" contains a translation entry 1 for the first physical page. Each physical page of the physical address contains its own entry. In one embodiment, the last word "P+K", where "P" is a predetermined number greater than 2, and "K" is equal to the number of pages the data buffer spans −1 as illustrated by block 279. If a data buffer spans ten pages, then there will be ten translation entries at the end of descriptor 289. Thus, caching the physical address of objects greater than one page size is supported by embedding multiple translations within a descriptor.

A sample physical translation format 281 is also shown in FIG. 2B. In one embodiment, this format 281 includes a valid bit 283, protection bits 285 and the actual physical page bits 287. The valid bit 283, in the descriptor, determines if a specific translation entry will be placed into the ATU (if valid bit 283 is set) or ignored (if valid bit 283 is cleared). The protection bits 285 are transferred through control line 560 of FIG. 5 in determining whether a page is accessible using the ATU's physical translation for the virtual address. For instance, a read-only page can be protected from writes with a read only page protection bit. The physical page bits 287 provide the virtual to physical address mapping for the corresponding portion of the data buffer in virtual address space. The data buffer pointed to by the data buffer pointer 273 can span one or more virtual pages and are not necessarily contiguously placed in physical memory.

Figure 3:
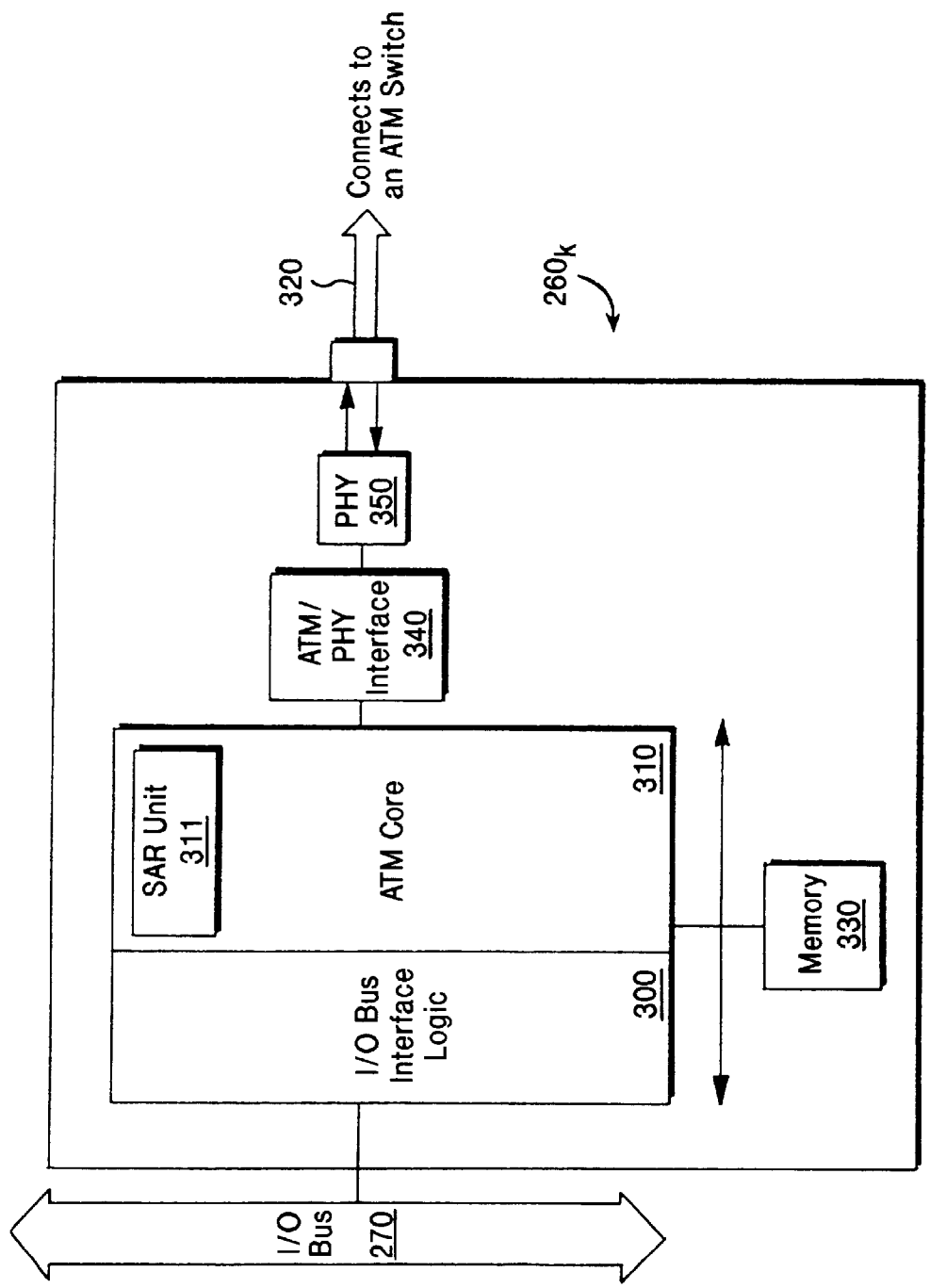
FIG. 3 is a block diagram of a general embodiment of a NIC interconnecting communication medium of a network and an I/O bus of a workstation coupled to the network.

Referring to FIG. 3, one of the plurality of I/O devices, for example I/O device $260_k$, includes a Network Interface Circuit ("NIC"). The NIC $260_k$ includes I/O bus interface logic 300 and an ATM core 310, both of which collectively operate to transfer data between the electronic system and other remotely located electronic systems through multiple virtual channels normally utilizing full duplex media 320. The media 320 may include optical fiber, twisted pair or any other high speed communication medium normally supporting a transfer rate of 155 million bits per second ("Mbps"), 622 Mbps, or even at speeds faster than 622 Mbps.

The ATM core 310 features a segmentation and reassembly ("SAR") unit 311 which facilitates segmentation and reassembly of data cells (e.g., a standard ATM cell absent a checksum byte) and utilizes off-chip memory 330 for storage. The ATM core 310 exchanges data cells with an ATM/physical interface 340 conforming to the well-known Universal Test and Operations Physical Interface for ATM ("UTOPIA") standard. The ATM/physical interface 340 is positioned to insert a checksum in a header of an out-going data cell to produce an ATM cell or to calculate whether the checksum of an in-coming ATM cell is correct, and if so, removing the checksum before transferring the data cell into the ATM core 310. A physical layer 350 is implemented for proper electrical voltage line termination. A description of the ATM core may be found in a co-pending U.S. patent application entitled "Method and Apparatus for Coordinating Data Transfer Between Hardware and Software" (application Ser. No. 08/499,317; filed Jul. 7, 1996) by Rasoul Oskouy and Denton E. Gentry. That U.S. patent application is owned by Assignee of the present application.

For ATM cell transmission, the ATM core 310 is initially provided a starting location of the TX descriptor ring. The ATM core 310 fetches the first TX descriptor to obtain the virtual address of the data buffer associated with the first TX descriptor. Next, the data buffer is accessed to propagate data into the SAR unit 311 for segmentation into one or more ATM cells transmitted through the physical media 320. After transmission of the ATM cell(s) (or at least storage of the data in local buffers of SAR unit 311), the SAR unit 311 may acknowledge completion by writing status information to the TX completion descriptor ring and generating an interrupt to the system to alert the processor accordingly.

Figure 4:
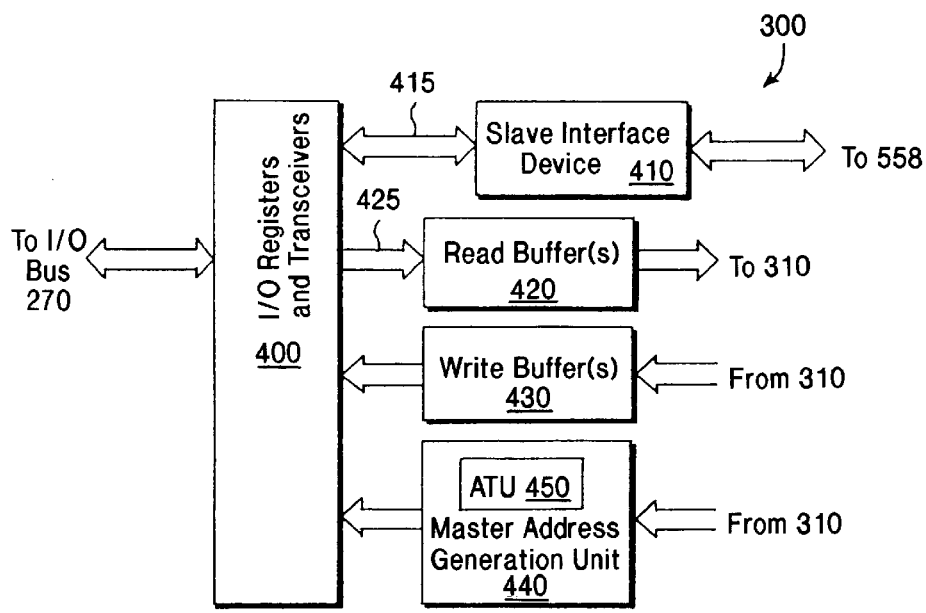
FIG. 4 is a block diagram of one embodiment of the I/O bus interface logic including an address translation unit.
Figure 5:
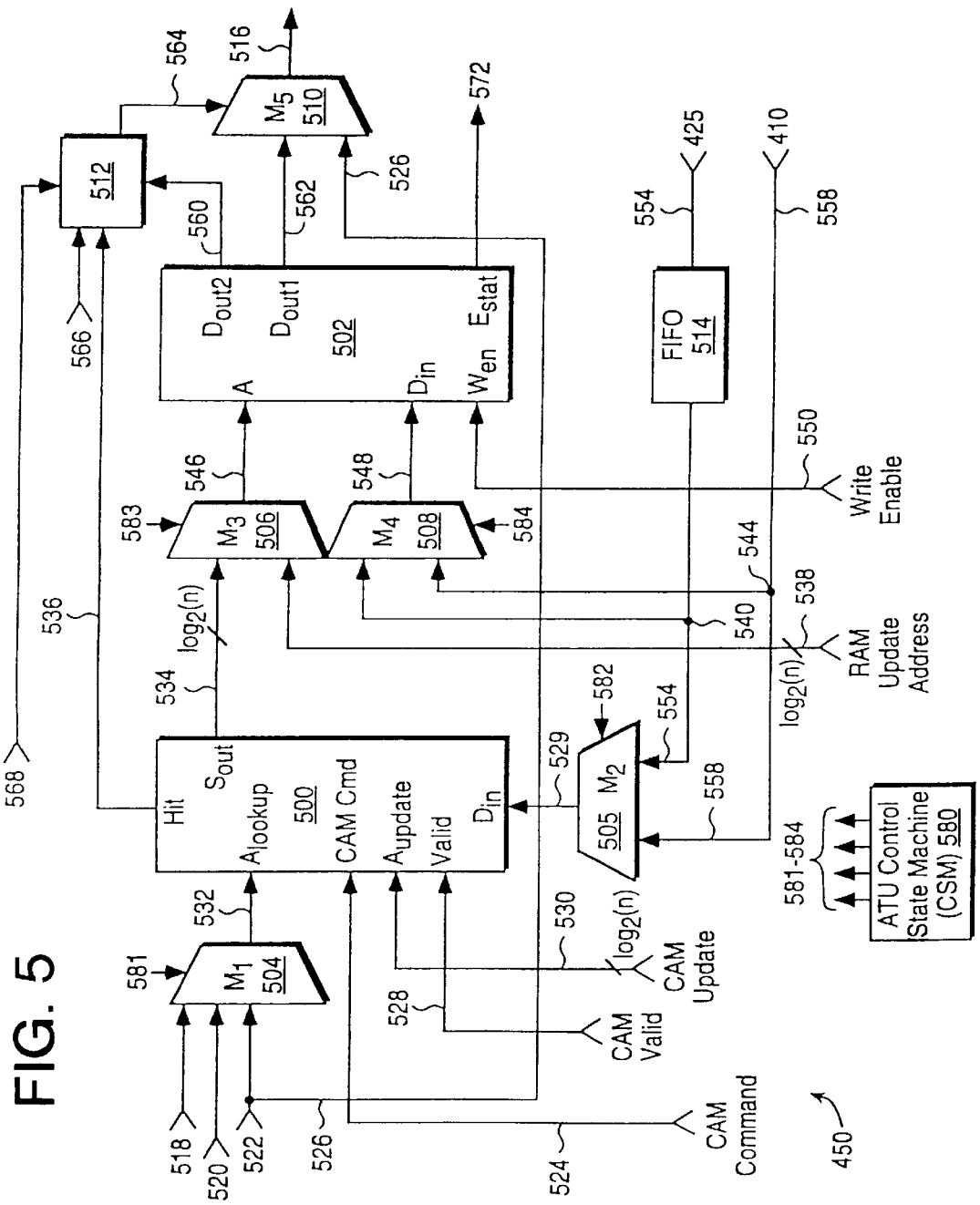
FIG. 5 is a block diagram of a preferred embodiment of the address translation unit ("ATU") of FIG. 4.

During reception, incoming ATM cells are reassembled into packets of data which are subsequently stored in free memory buffers indicated by a virtual address pointer contained in its corresponding RX descriptor. Referring now to FIG. 4, an embodiment of the I/O bus interface logic 300 coupled to the I/O bus 270 (e.g., PCI bus with a 64-bit address/data lines operating at approximately 66 MHz for this embodiment) is shown. The I/O bus interface logic 300 includes I/O registers and transceivers 400 (e.g., PCI I/O registers and transceivers) coupled to at least a slave interface device 410 via an I/O bus line 415, one or more read buffers 420 via an input bus 425, as well as one or more write buffers 430, and a master address generation unit 440. Although not shown, the input bus 425 is further coupled to the master address generation unit 440, namely a FIFO storage element as shown in FIG. 5, to receive descriptor related information. The read buffer(s) 420 is (are) used to temporarily store information from the I/O bus 270 while the write buffer(s) 430 is (are) used to temporarily store information via a write data path from the SAR unit.

Implemented within the master address generation unit 440 is an address translation unit ("ATU") 450 that receives information from the SAR unit 311 of the ATM Core. This information includes the virtual address to be translated, the size of the address and the type of access (e.g., access to descriptor ring or buffer). The presence of the ATU 450 allows the electronic system to (i) translate the virtual address into a physical address and subsequently bypass the I/O MMU 250 of FIG. 2A, or (ii) transmit the virtual address to the I/O MMU 250 of FIG. 2A.

Referring now to FIG. 5, an embodiment of the ATU 450 is shown. The ATU 450 may be configured to be fully associative. However, it is contemplated that another memory access scheme, such as direct mapped or N-way associative, may be utilized in order to meet a desired translation hit rate.

The ATU 450 includes a content addressable memory ("CAM") element 500 and random access memory ("RAM") element 502, which collectively contain "n" address translations ("n" being a whole number, $n \geq 1$). More specifically, the CAM element 500 includes logic that supports loading of a virtual address and control information in one of "n" entries as well as performing address lookup searches of the entries. The control information may include a CAM Valid bit indicating, when set, that the entry contains a virtual address currently being used for address translations. The CAM element 500 further includes (i) a plurality of input ports and (ii) a plurality of output ports.

The plurality of input ports are used to load address and control information into the entries of the CAM element 500. As shown, there are five (5) input ports used to load information into the CAM element. The first input port is a data input ("$D_{in}$") port used for loading a selected virtual address provided by a select element (e.g., MUX 505) via address lines 529. The second input port is an address update ("$A_{update}$") port for receiving, via CAM Update address lines 530 an entry number of the entry selected to be loaded with the virtual address on the data lines 529. The third input port is a command ("CAM command") port from which the CAM element 500 receives command information to control its operation via command lines 524. Types of commands include, but are not limited to "Translate" or "Update". In addition, the fourth input port is an entry valid ("Valid") port through which a control line 528, representative of the CAM Valid bit of an entry addressed by the $A_{update}$ port, is asserted or de-asserted depending on if the entry is "valid" (e.g., in a "valid" state or currently being used), or "invalid" (e.g., in an "invalid" state or stale). The fifth input port is an address lookup ("$A_{lookup}$") port from which the CAM element 500 receives a virtual address (e.g., page number) via lookup address lines 532 to be compared with the virtual addresses stored in each of its entries. If a match occurs, an output ("Hit") port and its control line (referred to as "CAM_Hit" 536) is asserted (i.e., an active signal is produced). As a result, a signal out ("$S_{out}$") port propagates the entry number of the CAM entry containing the virtual address through signal lines 534.

Referring still to FIG. 5, the RAM element 502 is configured to contain the corresponding physical address for the virtual address stored in CAM element 500. Similar to the CAM element 500, the RAM element 502 includes a plurality of input and output ports. More particularly, the RAM element 502 includes a data input ("$D_{in}$") port used for loading, via data lines 548, a physical address corresponding to the virtual address previously into the CAM element 500. The RAM element 502 further includes an address ("A") port for entry lookups and entry updates. A write enable ("$W_{en}$") port is used to distinguish between an entry update (e.g., $W_{en}$ line 550 being asserted) and entry look-up (e.g., $W_{en}$ line 550 being de-asserted). In addition, the RAM element 502 includes a first data out ("$D_{out1}$") port to output the physical address corresponding to the virtual address being translated or searched, via address lines 562 and a second data out ("$D_{out2}$") port to output write protection information contained in the selected entry via control line 560. Moreover, the RAM element 502 includes an entry status ("$E_{stat}$") port to provide information indicating which entries of the CAM and RAM elements has been accessed via Entry status lines 572.

In addition to the CAM and RAM elements 500 and 502, the ATU 450 further includes a first group of control logic that controls the loading and flushing of the address translations, and a second group of control logic that controls whether the ATU 450 should output a virtual or physical address via address lines 516. An indicator used to bypass I/O MMU may include, but is not limited to, a high order address bit being set or cleared, a specific subset of the address space being accessed, etc. For example, in one embodiment, the bridge element 240 such as that shown in FIG. 2A provides an address range within the 64-bit address space which when accessed treats the lower 41 bits of the address as a physical address.

As shown, the first group of control logic includes a plurality of select elements 504–506 and 508 (e.g., multiple input multiplexers), and a first-in, first-out ("FIFO") storage element 514. The FIFO storage element 514 is used to temporarily store virtual/physical address translations as they are read from the input bus 425 during descriptor fetches.

The plurality of select elements 504–506 and 508 are controlled by ATU control state machine 580 through control lines 581–584. A first select element 504 is coupled to the $A_{lookup}$ port of the CAM element 500 via lookup address lines 532 in order to route the virtual address to be searched within the CAM element 500. This select element receives as input virtual addresses (or virtual page numbers) through software flush address lines ("SW Flush address lines") hardware flush lines 518, ("HW Flush address lines") 520 and address lines 522 for usual translation loading. The second select element 505 is coupled to the $D_{in}$ port of the CAM element 500 via data lines 529 to load either a (i) virtual address obtained from a descriptor fetch via lines 554, or alternatively, (ii) a virtual address of a data buffer specified manually by software writing the buffer's virtual address into CAM element 500. This is an access of the slave interface device 410 resulting in that virtual address being placed on lines 558. A third select element 506 is coupled to the address port via address lines 546 to transmit therein either a RAM Update address via a RAM Update address line 538 or an entry number output from the CAM 502 element through the $S_{out}$ port via signal lines 534. The fourth select element 508 is coupled to the $D_{in}$ port via address lines 548 to input physical addresses and control information from lines 540 and 544.

The second group of control logic includes a hit/miss logic circuit 512 and a fifth select element 510. The hit/miss logic circuit 512 is combinatorial logic configured to control whether the fifth select element 510 outputs onto the address lines 516 (i) a translated physical address received from lines 562 or (ii) the virtual address for lines 526 to be subsequently translated by the I/O MMU. Such control is performed by the assertion or de-assertion of an ATU_Hit control line 564.

The translated physical address is output from the fifth select element 510 under all conditions unless (i) the CAM_Hit line 536 is not asserted thereby indicating a "lookup miss", (ii) the ATU 450 is disabled by System software not asserting an ATU enable line 566, (iii) a cycle status line 568 is not asserted indicating that this particular translation should be avoided, or (iv) the protection bits 560 signify that the cycle in progress is prohibited due to reasons including, but not limited to, an attempted write access of a read-only page.

Figure 6:
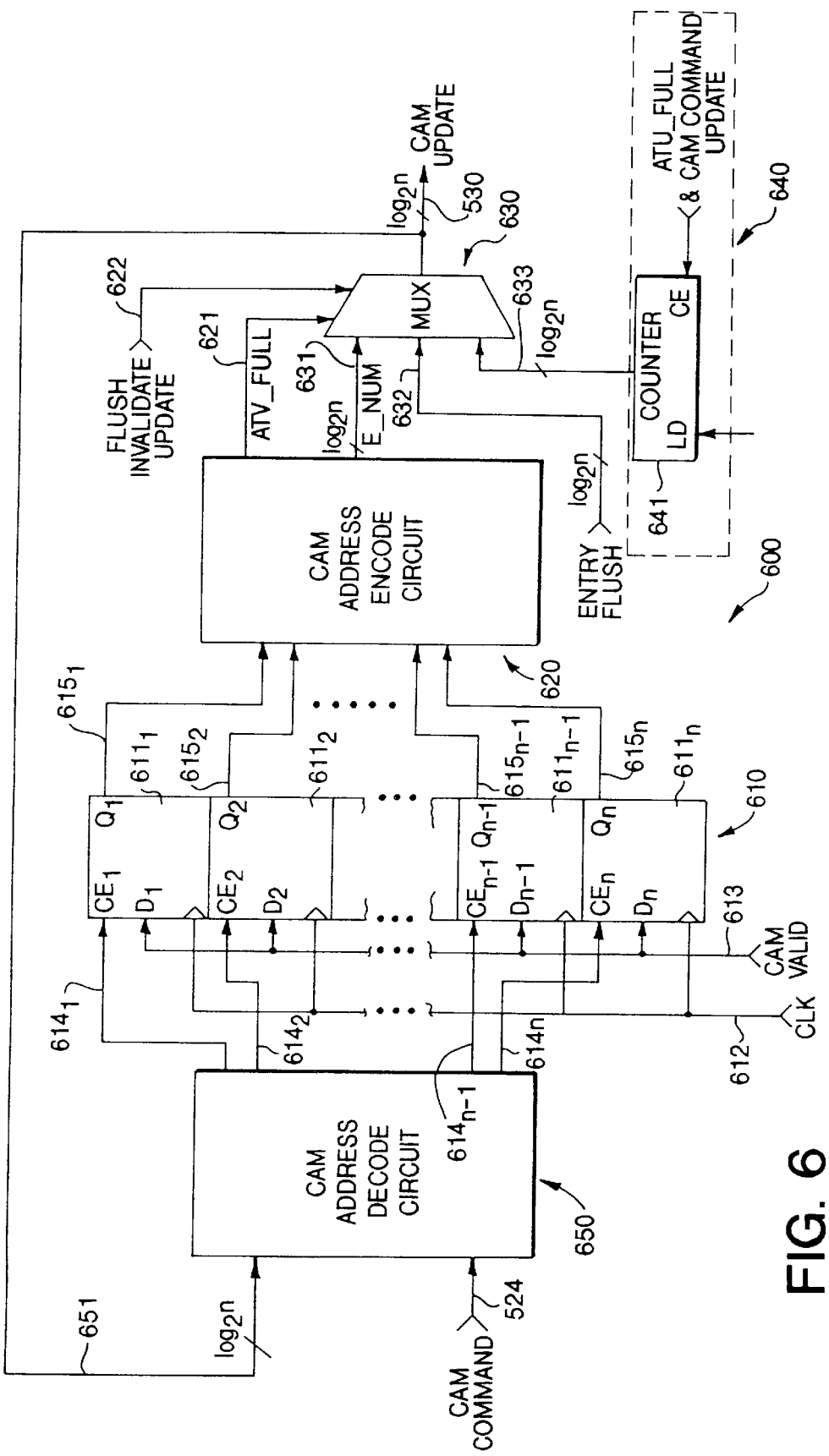
FIGS. 6–7 are block diagrams of portion of an ATU control state machine that controls replacement of address translations for entries of the ATU of FIG. 5.
Figure 7:
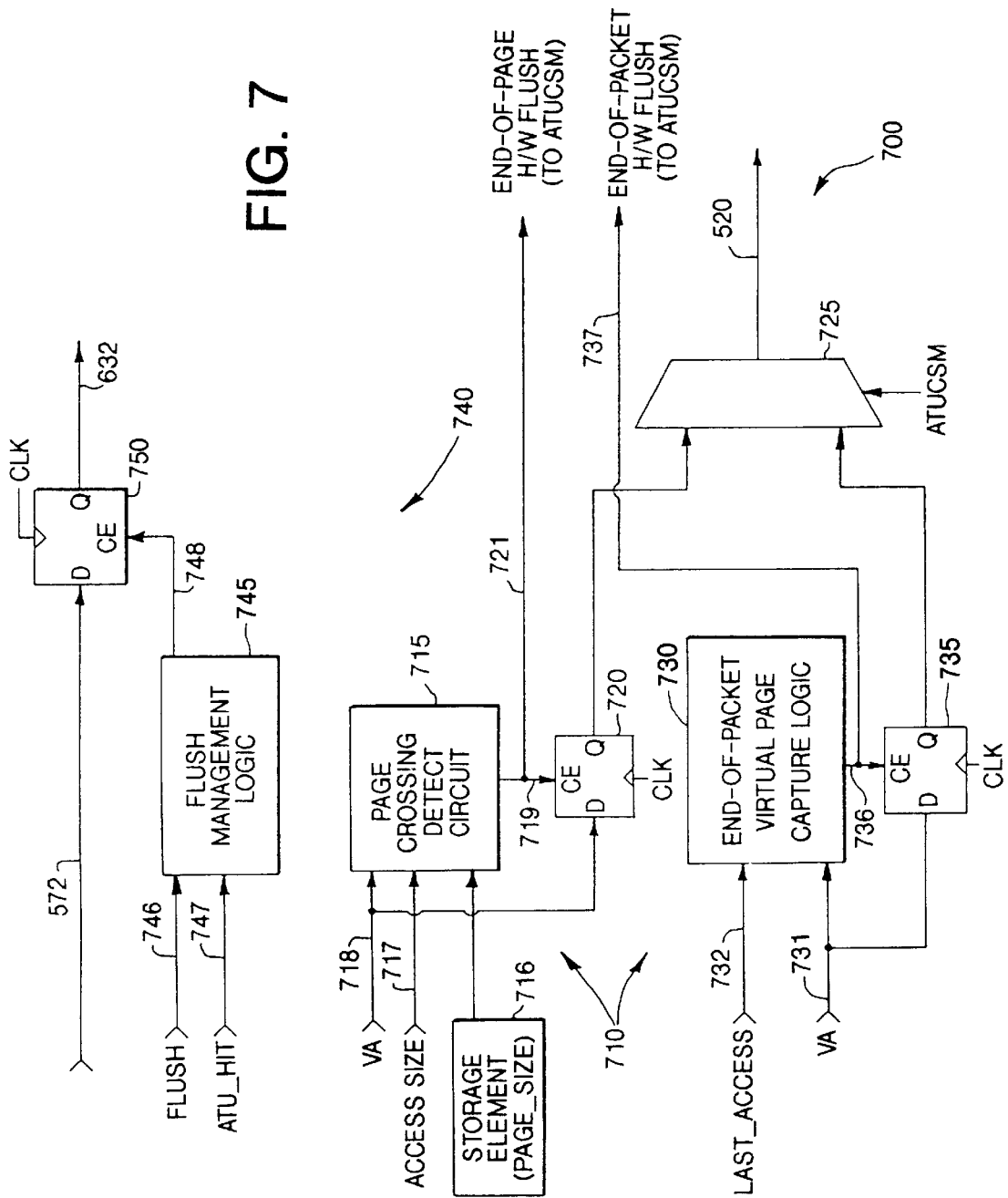

Since the ATU 450 is implemented with memory supporting a limited number of address translations, it would be advantageous to implement circuitry to control efficient storage and replacement of these address translations. Such control may be handled by replacement circuitry being a portion of the ATU control state machine 580. As shown in FIGS. 6–7, this replacement circuitry includes an update control circuit 600 and a flush control circuit 700. Collectively, the update control circuit 600 and the flush control circuit 700 are configured to support a number of functions, including but not limited to, (i) determining within which CAM/RAM entry of the ATU a new address translation should be stored, (ii) determining which prior address translation is to be replaced when every current address translation contained in the ATU is being used, and (iii) removing address translations that are no longer needed.

Referring now to FIG. 6, an embodiment of the update control circuit 600 is shown, wherein the update control circuit 600 comprises an ATU replacement element 610, a CAM Address Encode circuit 620, a select element 630, an increment circuit 640 and a CAM Address Decode circuit 650. The update control circuit 600 is coupled to the CAM Update Address control lines 530 to select which entry of the CAM element is to be loaded with a virtual address from either the I/O bus line 415 or the input bus 425 of FIGS. 4 and 5. It is contemplated, however, that the RAM Update address lines 538 may be coupled to the CAM Update address lines 530 in order to receive the same entry number selections to maintain operation coherency.

The ATU replacement element 610 is a plurality of storage elements (e.g., "n" storage elements $611_1$–$611_n$), each storage element uniquely corresponding to one CAM entry. As shown in FIG. 6, each of the plurality of storage elements $611_1$–$611_n$ is implemented as a 1-bit register being clocked at a predetermined frequency "CLK" through clock line 612. It is contemplated, however, that the storage elements $611_1$–$611_n$ may include other types of storage devices besides 1-bit registers.

When one of a plurality of clock enable control lines $614_1$, . . . , or $614_n$ (e.g., clock enable control line $614_1$) is asserted by the CAM Address Decode circuit 650, a storage element associated with the clock enable control line (e.g., storage element $611_1$) is "set" by loading a CAM Valid bit value therein. The CAM Valid bit value (e.g., a logic "1") is loaded via a data input line 613 in order to represent that the CAM and RAM entries, corresponding to the storage element, contain a valid address translation. Thus, the plurality of storage elements $611_1$–$611_n$ provide an external copy of the state of each CAM entry.

The CAM Address Encode circuit 620 is combinatorial logic coupled to the ATU replacement element 610 in order to monitor the contents of each of the plurality of storage elements $611_1$–$611_n$. Typically, this monitoring is performed by reading the contents of the storage elements $611_1$–$611_n$ provided through data lines $615_1$–$615_n$ and then ascertaining if at least one storage element $611_1$, . . . , or $611_n$ is not set (e.g., determining if at least one CAM entry is not currently being used for translations). The CAM Address Encode circuit 620 further includes an ATU_Full select line 621 and a number (e.g., $\log_2(n)$) of data input lines 631 (referred to as "E_Num" lines 631) of the select element 630.

Upon detecting at least one storage element that is not set (referred to as an "empty storage element"), the CAM Address Encode circuit 620 performs three operations. Namely, the CAM Address Encode circuit 620 (i) selects the empty storage element, (ii) outputs an entry number, which represents the location of the empty storage element in the ATU replacement element 610, to the select element 630 via the E_Num lines 631, and (iii) de-asserts the ATU_Full select line 621. Thereafter, the entry number is transferred through the select element 630 to the CAM Update address lines 530, thereby loading the virtual address of the address translations in an entry of the CAM element corresponding to the entry number. Moreover, the physical address of the address translation is preferably loaded in an entry of the RAM element corresponding to the entry number. However, if there does not exist any empty storage elements, the CAM Address Encode circuit 620 asserts the ATU_Full select line 621 thereby controlling the select element 630 to output a count value produced by the increment circuit 640 as described below.

As further shown, the select element 630 is a multi-input multiplexer, or a group of multi-input multiplexers coupled together to transmit one of a plurality of data inputs. The data inputs of the select element 630 include the entry number via the E_Num lines 631, a "flush entry number" (provided by the flush control circuit 700 of FIG. 7) via input lines 632 (i.e., "Flush" lines), and a count value from the increment circuit 640 via input lines 633 (i.e., "Count" lines). The selection of one of these inputs as the output is controlled by the assertion or de-assertion of the ATU_Full select line 621 by the CAM Address Encode circuit 620 and whether or not the ATU control state machine (not shown) is supporting a flush operation represented by assertion or de-assertion of a Flush Invalidate Update control line 622.

If all of the address translations are actively being used, as signified by all of the CAM Valid bits for the CAM entries and storage elements $611_1$–$611_n$ of the ATU replacement element 610 being "set", the ATU_Full select line 621 is asserted. Assertion of the ATU_Full select line 621 causes the count value, provided by the increment circuit 640, to be output from the select element 630 through the CAM Update address lines 530. The count value represents which entries of the CAM and RAM elements are to be loaded with the new address translation. The increment circuit 640 includes a "Modulo n" counter 641 which is incremented and enabled when the ATU_Full select line 621 is asserted and a CAM Update command is produced by the ATU control state machine 580 of FIG. 5.

The CAM Address Decode circuit 650 includes combinatorial logic coupled to the select element 630 through a feedback loop 651 in order to update the contents of the ATU replacement element 610 based on a modification to a CAM entry in a prior cycle. This entry modification is represented by the entry number, the flush entry number, or the count value being transmitted through the CAM Update address lines 530. The CAM Address Decode circuit 650 is further coupled to the ATU control state machine (not shown) to monitor when a CAM Update command is asserted via CAM command lines 524, and in response, to assert a clock enable control line $614_1$, . . . , or $614_n$ associated with the storage element $611_1$, . . . , or $611_n$ that corresponds to the CAM entry being updated.

Referring now to FIG. 7, an embodiment of the flush control circuit 700 is shown. The flush control circuit 700 comprises a first circuit 710 coupled to the HW Flush address lines 520 of the ATU (see FIG. 5) and a second circuit 740 coupled to the Flush lines 632 coupled to the select element 630 of the update control circuit 600 (see FIG. 6). The first circuit 710 is configured to propagate a virtual page number to the CAM element if one of two events occurs; namely, a page crossing or an end-of-packet access. "Page crossing" is an event when a data access is made to the last group of bytes (e.g., 64 bytes) of the virtual page. Since the ATU is monotonic by accessing bytes within a page in ascending order, an access to the last group of bytes denotes the last use of that page and its ATU entry. An "end-of-packet" is an event when the last access is being made for the packet of data. This event may be signified by a completion ring update or activation of an last access signal as shown. A primary purpose of the first circuit 710 is to obtain the flush entry number of the CAM and RAM elements that are associated with the virtual page containing the last group of bytes before a page crossing or the last group of bytes of a particular packet of data. The flush entry number may be obtained from the Entry status lines 572 of the ATU.

More specifically, the first circuit 710 includes page crossing detect logic 715 and an end-of-packet virtual page capture logic 730, both of which are combinatorial logic. The page crossing detect logic 715 is coupled to a programmable storage element 716 which is programmed to contain a page size supported by the DVMA system. The page size may be set to any page size, preferably ranging from 2 KB to 16 MB, although smaller or larger page sizes are handled similarly. The page crossing detect logic 715 further receives as input an access size and a virtual address from the SAR unit via input lines 717 and 718. The access size represents the number of bytes being accessed from memory during operation while the virtual address represents the starting address associated with the access.

The page crossing detect logic 715 utilizes the virtual address, page size and access size to determine whether that access will involve data from another virtual page contiguous to the current virtual page. If so, the address translation associated with the starting virtual page would be invalid after the access. Since one goal of the replacement circuitry is to quickly flush invalid address translations, the page crossing detect logic 715 asserts clock enable lines 719 coupled to a first set of storage elements 720 to load the virtual page number therein and assert an end-of-page trigger line 721. The ATU control state machine detects the assertion and appropriately configure a select element 725 and the first select element 504 of the ATU to route the virtual page number into the CAM element via the Hardware Flush address lines 520. Upon the virtual page number is loaded into the $A_{lookup}$ port of the CAM element and that virtual page number is located in the CAM element, its entry number, namely the flush entry number, is subsequently loaded into the RAM element via the $S_{out}$ port to be output from the $E_{stat}$ port of the RAM element through the Entry status lines 572.

Furthermore, the end-of-packet virtual page capture logic 730 may receive a virtual address acting as an ending virtual address of the access, and a LAST_Access signal from the SAR unit via lines 731–732. The LAST_Access signal operates as an enable signal to indicate, when active, that the current access involves an end-of-packet event. It is contemplated, however, that other techniques may be employed besides a dedicated LAST_Access signal such as detection of a last access by monitoring accesses to a completion ring.

Upon receiving the virtual address and the LAST_Access signal being active, the capture logic 730 asserts clock enable lines 736 and an end-of-packet trigger line 737. The asserted clock enable lines 736 causes a virtual page number from the virtual address to be loaded into a second set of storage elements 735. The asserted end-of-packet trigger line 737 causes the ATU control state machine to appropriately configure the select element 725 and the second select element of the ATU to route the virtual page number into the CAM element via the Hardware Flush address lines 520, and subsequently obtain the flush entry number through the Entry status lines 572.

Referring still to FIG. 7, the second circuit 740 is configured to signal the update control circuit 600 of FIG. 6 to output the particular entry number placed on the Entry status lines 572 in a previous cycle (hereafter referred to as the "flush entry number") through the CAM Update address lines 530 during a hardware or software flush operation. The second circuit 740 includes flush management logic 745 and a third set of storage elements 750 configured to temporarily contain the flush entry number. During a flush operation, if the ATU-Hit select line 564 is asserted as indicated by lines 746 and 747, the flush management logic 745 asserts clock enable lines 748 in order to allow the flush entry number to be loaded into the third set of storage elements 750.

Thereafter, as shown in FIGS. 5 and 6, the flush entry number is propagated through the Flush lines 632 to the select element 630 of the update control circuit 600. The Flush Invalidate Update control line 622 is asserted by the ATU control state machine 580 so that the flush entry number is output from the select element 630 of the update control circuit 600 (see FIG. 6) through the CAM Update address lines 530 of the ATU of FIG. 5. Concurrently, the CAM Valid control line 531 is de-asserted by ATU control state machine 580 to indicate that entry now contains an invalid address translation.

Figure 8A:
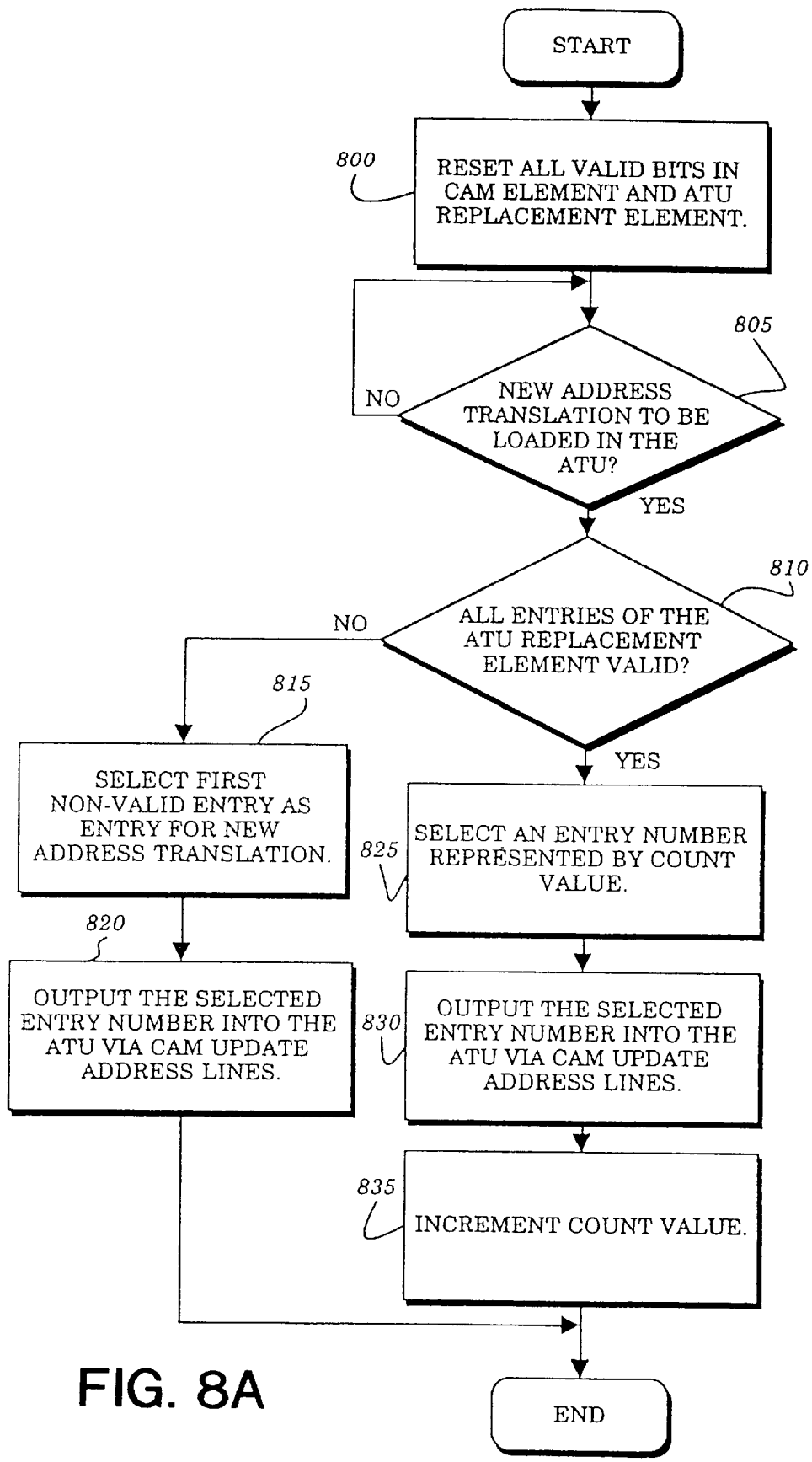
FIGS. 8A and 8B are flowcharts illustrating an embodiment of the operational steps undertaken by the replacement circuitry in performing address translation replacement in the ATU as well as end-of-packet and end-of-page flush operations.
Figure 8B:
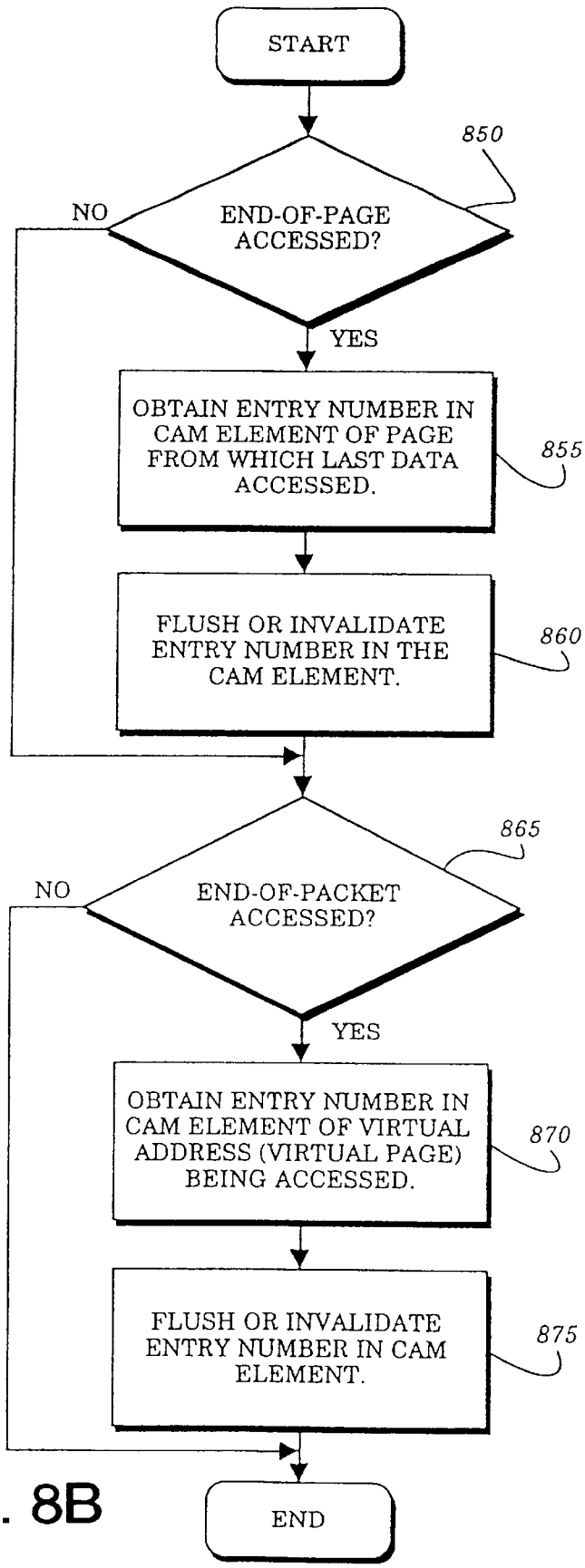

Referring now to FIGS. 8A and 8B, an embodiment of the operational steps of replacement circuitry is shown. First, in Step 800 of FIG. 8A, the CAM valid bits of the CAM element and the storage element of the ATU replacement element, namely all "valid" bits, are reset. Next, in Step 805, a determination is made by the ATU control state machine 580 as to whether a new address translation is to be loaded into the ATU. Such determination may be made on a time-based detection circuit or through dedicated control signals.

In the event that the ATU detects that a new address translation is to be loaded, the replacement circuitry of the ATU determines whether all entries of its ATU replacement element, corresponding to the current state of the CAM element, are valid (Step 810). If there exist some entries which are still invalid, the ATU replacement circuitry selects the entry number of the first non-valid entry encountered and outputs the selected entry number to the ATU via the CAM Update address lines (Steps 815 and 820). If none of the entries of the ATU replacement element are "invalid", indicating that all the entries of the CAM element contain actively used address translations, replacement is achieved by selecting an entry number represented by a count value (Step 825). The count value is produced by the increment circuit. Thereafter, the selected entry number is transferred to the ATU through the CAM Update address lines (Step 830). Thereafter, the increment circuit is incremented to select a subsequent entry number (Step 835).

In FIG. 8B, the operations of the replacement circuitry perform end-of-page and end-of-packet entry invalidations. With respect to the end-of-page entry invalidation, the replacement circuitry detects when the last portion of data on a page is accessed (Step 850). Next, the replacement circuitry obtains the entry number in the CAM elements from which the last portion of data is being accessed (Step 855). Upon obtaining the entry number, the replacement circuitry performs a flush operation to invalidate that entry (Step 860). With respect to the end-of-packet entry invalidation, in Step 865, the replacement circuitry first detects a last access of a packet of data. Upon detecting the last access, the replacement circuitry obtains the entry number in the CAM element of the virtual address associated with the packet of data being accessed (Step 870). Upon obtaining the entry number, the replacement circuitry performs a flush operation to invalidate that entry (Step 875).

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A circuit comprising:
    a memory element; and
    a control circuit to update contents of the memory element, the control circuit including
        a plurality of storage elements, each storage element corresponding to an entry of a plurality of entries of the memory element,
        circuitry to ascertain a state of each of the plurality of entries and to provide a first entry number corresponding to an entry of the plurality of entries in an invalid state,
        a counter to provide a count value to represent a second entry number of an entry to be modified when all of the plurality of entries are in a valid state, and
        a select element coupled to both the circuitry and the counter, the select element to output either the first entry number or the count value.

2. The circuit of claim 1 further comprising:
    a flush control circuit coupled to the select element of the control circuit, the flush control circuit to signal the control circuit to set an entry of the plurality of entries to an invalid state upon detecting an event signifying that the contents of the entry are invalid.

3. The circuit according to claim 1, wherein the select element is coupled to a select line asserted when the circuitry determines each of the plurality of entries is in a valid state.

4. The circuit of claim 2 operates in cooperation with an address translation unit.

5. The circuit according to claim 4, wherein the flush control circuit includes
    a page crossing detect logic to receive as input a virtual address and a plurality of parameters including a page size and an access size; and
    a first set of storage elements coupled to the page crossing detect logic, the first set of storage elements being controlled by the page crossing detect logic to transfer a virtual page number of the virtual address to the address translation unit upon detection of a page crossing event by the page crossing detect logic.

6. The circuit according to claim 4, wherein the flush control circuit further includes a flush circuit coupled to the address translation unit, the flush circuit to (i) receive an entry number, corresponding to the entry, from the address translation unit, and (ii) transfer the entry number to the control circuit to set the entry to the invalid state.

7. The circuit according to claim 6, wherein the flush circuit includes flush management logic coupled to the address translation unit, the flush management logic to detect whether a flush-related operation is being performed and whether the virtual page number is contained in the memory of the address translation unit; and a second set of storage elements controlled by the flush management logic, the second set of storage elements to receive the entry number and to transfer the entry number into the control circuit for use in setting the entry to the invalid state.

8. The circuit of claim 1 further comprising:

a flush control circuit to signal the control circuit to set an entry of the plurality of entries to an invalid state upon detecting an event signifying that contents of the entry are invalid.

9. The circuit according to claim 8, wherein the event includes an end-of-packet event.

10. The circuit according to claim 9, wherein the flush control circuit includes capture logic used to detect when the end-of-packet event occurs; and a set of storage elements coupled to the capture logic, the set of storage elements being controlled by the capture logic to transfer a virtual page number of the virtual address into the address translation unit, provided the capture logic detects the end-of-packet event.

11. The circuit according to claim 1, wherein the circuitry of the control circuit includes a content address memory (CAM) address encode circuit coupled to the plurality of storage elements to ascertain the state of each of the plurality of entries; and a CAM address decode circuit coupled to the select element and the plurality of storage elements to modify the state of the selected entry of the plurality of entries.

12. The circuit according to claim 11, wherein a first storage element of the plurality of storage elements is set to indicate that a first entry of the plurality of entries, corresponding to the first storage element, is in a valid state.

13. The circuit according to claim 11, wherein a first storage element of the plurality of storage elements is cleared to indicate that a first entry of the plurality of entries, corresponding to the first storage element, is in an invalid state.

14. The circuit according to claim 1, wherein upon receiving a command to load an address translation and detecting that each of the plurality of storage elements are set, the circuitry signals the select element to output the count value from the counter.

15. Implemented within an address translation unit, a circuit comprising:

a memory including a plurality of entries; and a flush control circuit including a first circuit to provide a virtual address to the address translation unit and to signal detection of an event, and a second circuit to receive a flush entry number, representative of an entry containing the virtual address, the second circuit including flush management logic to detect whether a flush operation is being performed and whether the virtual address is contained in the memory, and at least one storage element controlled by the flush management logic, the at least one storage element to receive the flush entry number and to transfer the flush entry number for use in setting the entry to an invalid state.

16. The circuit according to claim 15, wherein the event includes a page crossing event.

17. The circuit according to claim 16, wherein the flush control circuit further includes a page crossing detect logic to receive as input the virtual address, and a plurality of parameters including a page size and an access size; and at least one storage element coupled to and controlled by the page crossing detect logic, the page crossing detect logic to transfer the virtual address to the address translation unit, provided the page crossing detect logic detects the page crossing event.

18. The circuit according to claim 15, wherein the event detected by the flush control circuit further includes an end-of-packet event.

19. The circuit according to claim 15, wherein the flush control circuit further comprises capture logic used to detect when the end-of-packet event occurs; and a set of storage elements coupled to the capture logic, the set of storage elements being controlled by the capture logic to transfer a virtual page number of the virtual address into the address translation unit, provided the capture logic detects the end-of-packet event.

20. An address translation unit comprising:

a first memory element including a first plurality of entries, each entry for containing a virtual address;

a second memory element including a second plurality of entries, each entry for containing a physical address associated with a virtual address within an entry of the first plurality of entries; and circuitry for controlling loading and updating of the first memory element and the second memory element, the circuitry including flush management logic to detect whether a flush operation is being performed and whether a virtual address is contained in the first memory element, and at least one storage element controlled by the flush management logic, the at least one storage element to receive a flush entry number and to transfer the flush entry number for use in setting the entry to the invalid state.

21. The address translation unit of claim 20, wherein the first memory element includes a content addressable memory.

22. For modification of an entry of memory, a flush control circuit comprising:

a first circuit configured to detect an event; and a second circuit coupled to the first circuit, the second circuit including flush management logic to detect whether a flush operation is being performed and whether an invalid virtual address is contained in the entry, and at least one storage element controlled by the flush management logic, the at least one storage element to receive a flush entry number and to transfer the flush entry number for use in setting the entry to the invalid state.

23. The flush control circuit of claim 22, is utilized by an address translation unit.

* * * * *